US012621708B2

(12) United States Patent
Gan et al.

(10) Patent No.: US 12,621,708 B2
(45) Date of Patent: May 5, 2026

(54) SYSTEMS AND METHODS FOR DETECTING FIXED WIRELESS ACCESS UPLINK CONGESTION WITH A PACKET PROBE

(71) Applicant: Verizon Patent and Licensing Inc., Basking Ridge, NJ (US)

(72) Inventors: Seng Gan, Ashburn, VA (US); Anand Bhatia, Flower Mound, TX (US); Ritul K. Shah, Mechanicsburg, PA (US); Saibaba Attelli, Chalfont, PA (US); Khurram Abbas, Novi, MI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 476 days.

(21) Appl. No.: 18/447,129

(22) Filed: Aug. 9, 2023

(65) Prior Publication Data

US 2025/0056315 A1 Feb. 13, 2025

(51) Int. Cl.
*H04W 28/02* (2009.01)

(52) U.S. Cl.
CPC ............................... *H04W 28/0289* (2013.01)

(58) Field of Classification Search
CPC .................................................. H04W 28/0289
See application file for complete search history.

(56) References Cited

U.S. PATENT DOCUMENTS

| | | | | |
|---|---|---|---|---|
| 2018/0084476 A1* | 3/2018 | Kay | ...................... | H04L 45/243 |
| 2022/0201535 A1* | 6/2022 | Chay | ................. | H04W 74/0816 |
| 2024/0292404 A1* | 8/2024 | Polaganga | .......... | H04W 72/566 |

* cited by examiner

*Primary Examiner* — Suraj M Joshi

(57) ABSTRACT

A device may receive, from a packet probe, an uplink packet flow provided to a base station by a user equipment, and may add bytes for packets of the uplink packet flow in each scheduling interval of multiple scheduling intervals. The device may group the packets into bursts based on the multiple scheduling intervals and based on adding the bytes for the packets, and may calculate a transfer speed of each of the bursts. The device may calculate a maximum transfer speed for the bursts based on the transfer speed of each of the bursts, and may calculate a congestion delay for each of the bursts based on the maximum transfer speed for the bursts. The device may perform one or more actions based on the congestion delay for each of the bursts.

20 Claims, 9 Drawing Sheets

400

410 — Receive, from a packet probe, an uplink packet flow provided to a base station by a user equipment 420 — Add bytes for packets of the uplink packet flow in each scheduling interval of multiple scheduling intervals 430 — Group the packets into bursts based on the multiple scheduling intervals and based on adding the bytes for the packets 440 — Calculate a transfer speed of each of the bursts 450 — Calculate a maximum transfer speed for the bursts based on the transfer speed of each of the bursts 460 — Calculate a congestion delay for each of the bursts based on the maximum transfer speed for the bursts 470 — Perform one or more actions based on the congestion delay for each of the bursts

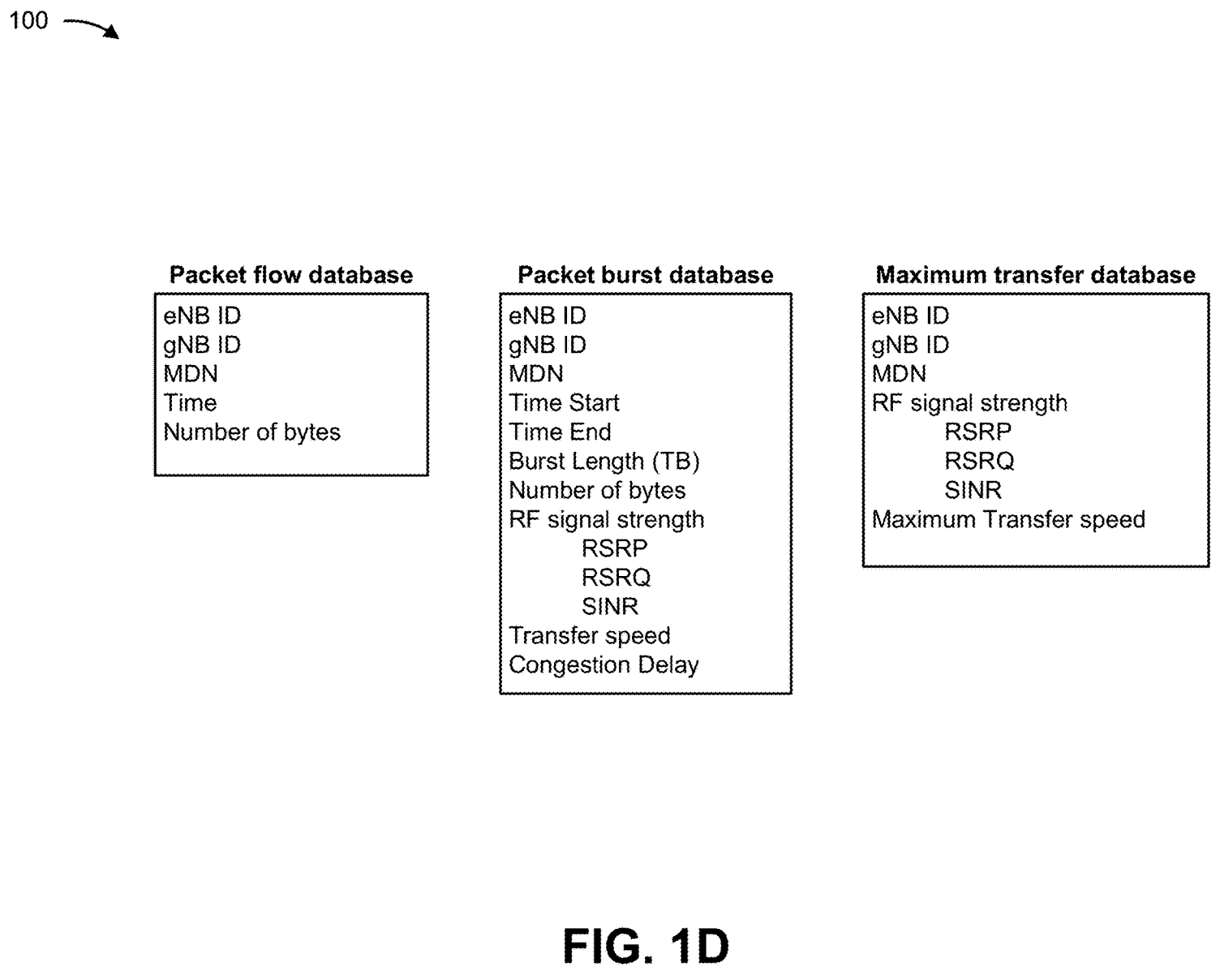

100

Packet flow database eNB ID
gNB ID
MDN
Time
Number of bytes

Packet burst database eNB ID
gNB ID
MDN
Time Start
Time End
Burst Length (TB)
Number of bytes
RF signal strength
   RSRP
   RSRQ
   SINR
Transfer speed
Congestion Delay

Maximum transfer database eNB ID
gNB ID
MDN
RF signal strength
   RSRP
   RSRQ
   SINR
Maximum Transfer speed

FIG. 1D

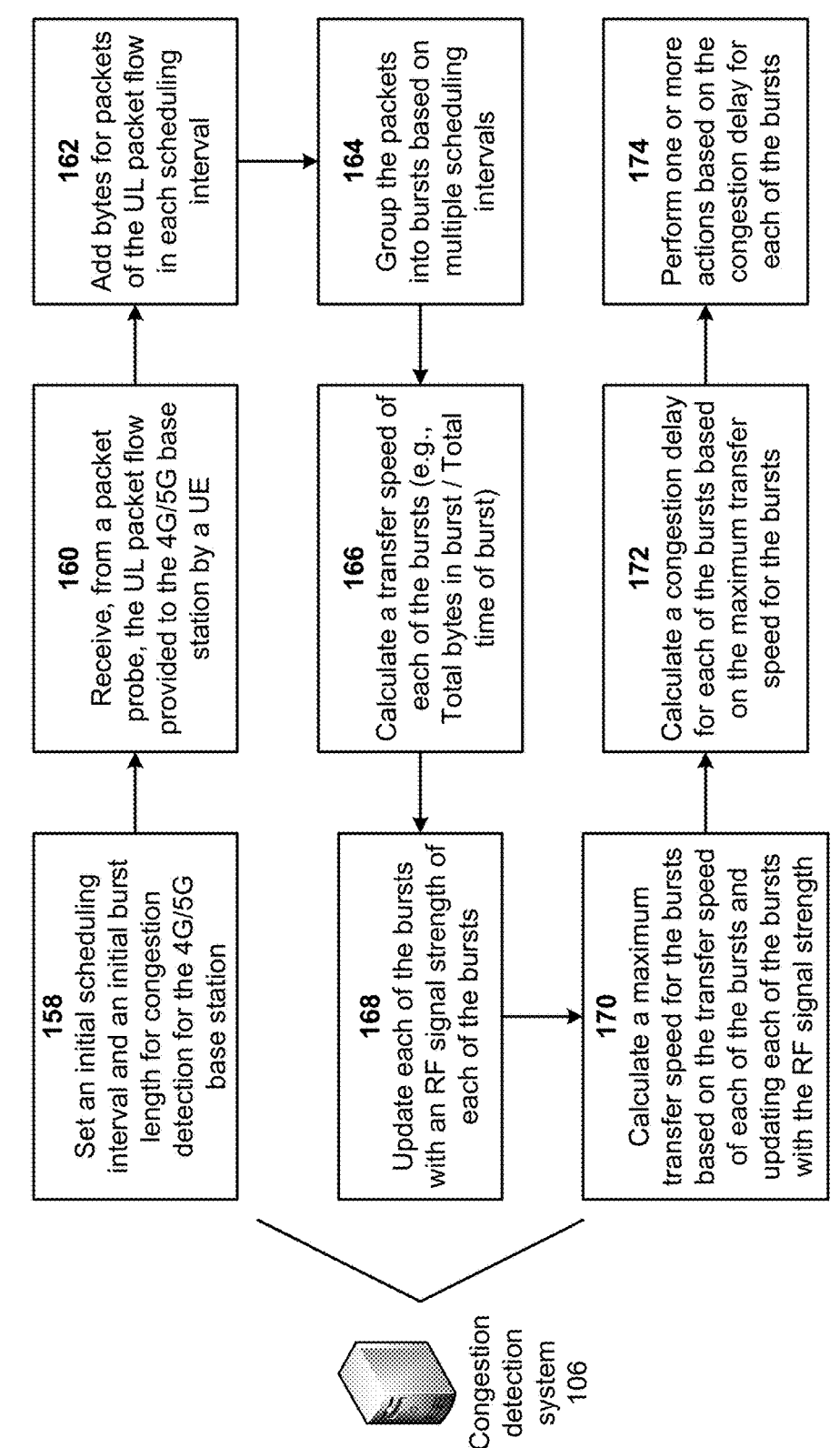

158
Set an initial scheduling interval and an initial burst length for congestion detection for the 4G/5G base station

160
Receive, from a packet probe, the UL packet flow provided to the 4G/5G base station by a UE

162
Add bytes for packets of the UL packet flow in each scheduling interval

164
Group the packets into bursts based on multiple scheduling intervals

166
Calculate a transfer speed of each of the bursts (e.g., Total bytes in burst / Total time of burst)

168
Update each of the bursts with an RF signal strength of each of the bursts

170
Calculate a maximum transfer speed for the bursts based on the transfer speed of each of the bursts and updating each of the bursts with the RF signal strength

172
Calculate a congestion delay for each of the bursts based on the maximum transfer speed for the bursts

174
Perform one or more actions based on the congestion delay for each of the bursts Congestion detection system
106

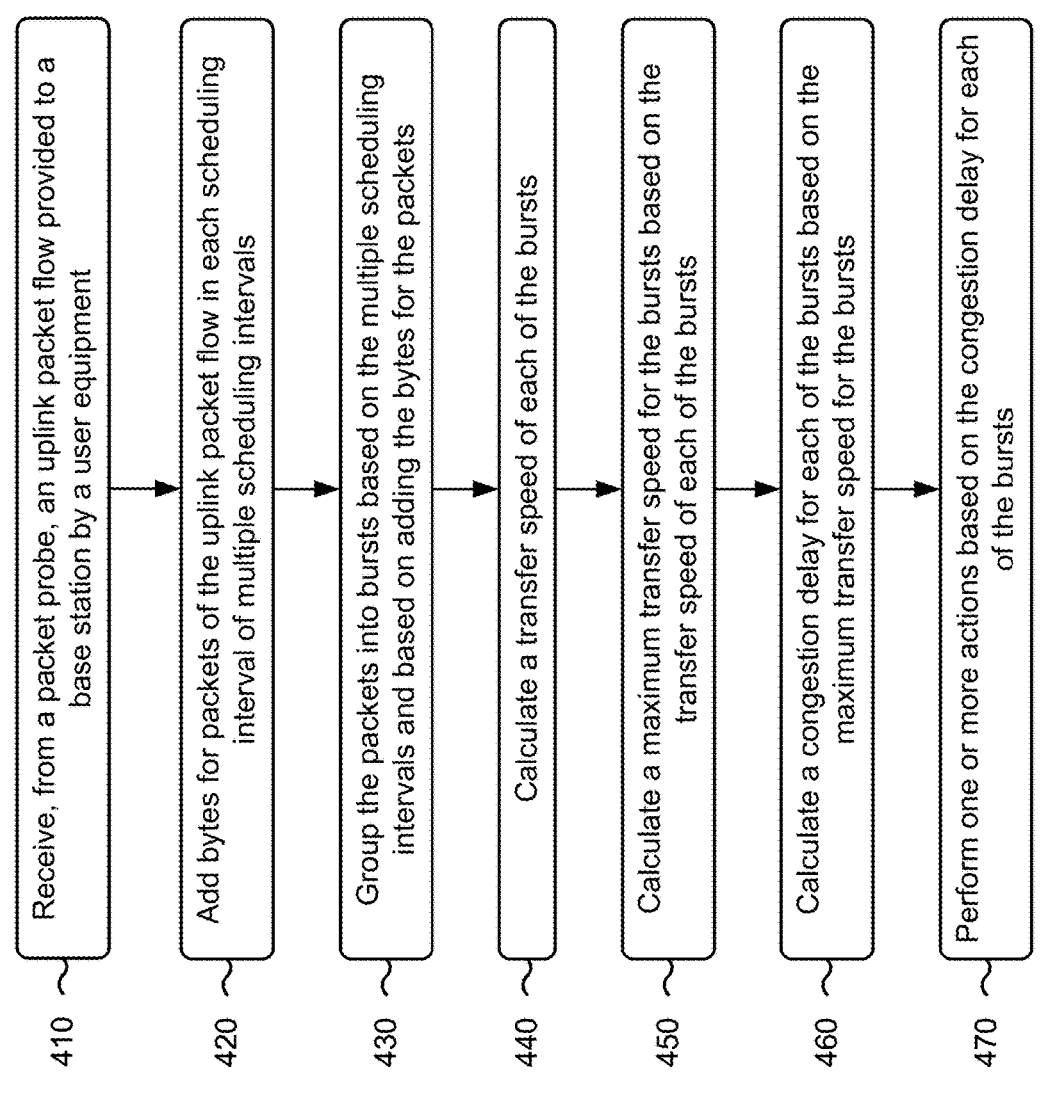

410 — Receive, from a packet probe, an uplink packet flow provided to a base station by a user equipment 420 — Add bytes for packets of the uplink packet flow in each scheduling interval of multiple scheduling intervals 430 — Group the packets into bursts based on the multiple scheduling intervals and based on adding the bytes for the packets 440 — Calculate a transfer speed of each of the bursts 450 — Calculate a maximum transfer speed for the bursts based on the transfer speed of each of the bursts 460 — Calculate a congestion delay for each of the bursts based on the maximum transfer speed for the bursts 470 — Perform one or more actions based on the congestion delay for each of the bursts

SYSTEMS AND METHODS FOR DETECTING FIXED WIRELESS ACCESS UPLINK CONGESTION WITH A PACKET PROBE

BACKGROUND

In a fifth-generation (5G) non-standalone (NSA) network, fixed wireless access (FWA) user equipment (UE) needs to be connected to a fourth-generation (4G) base station (e.g., an eNodeB or eNB) and a 5G base station (e.g., a gNodeB or gNB). In a 5G standalone (SA) network, the FWA UE need not be connected to the 4G base station and may connect to the 5G base station.

BRIEF DESCRIPTION OF THE DRAWINGS

FIGS. 1A-1F are diagrams of an example associated with detecting FWA uplink congestion with a packet probe.

FIG. 4 is a flowchart of an example process for detecting FWA uplink congestion with a packet probe.

DETAILED DESCRIPTION OF EXAMPLE EMBODIMENTS

Figure 1A:
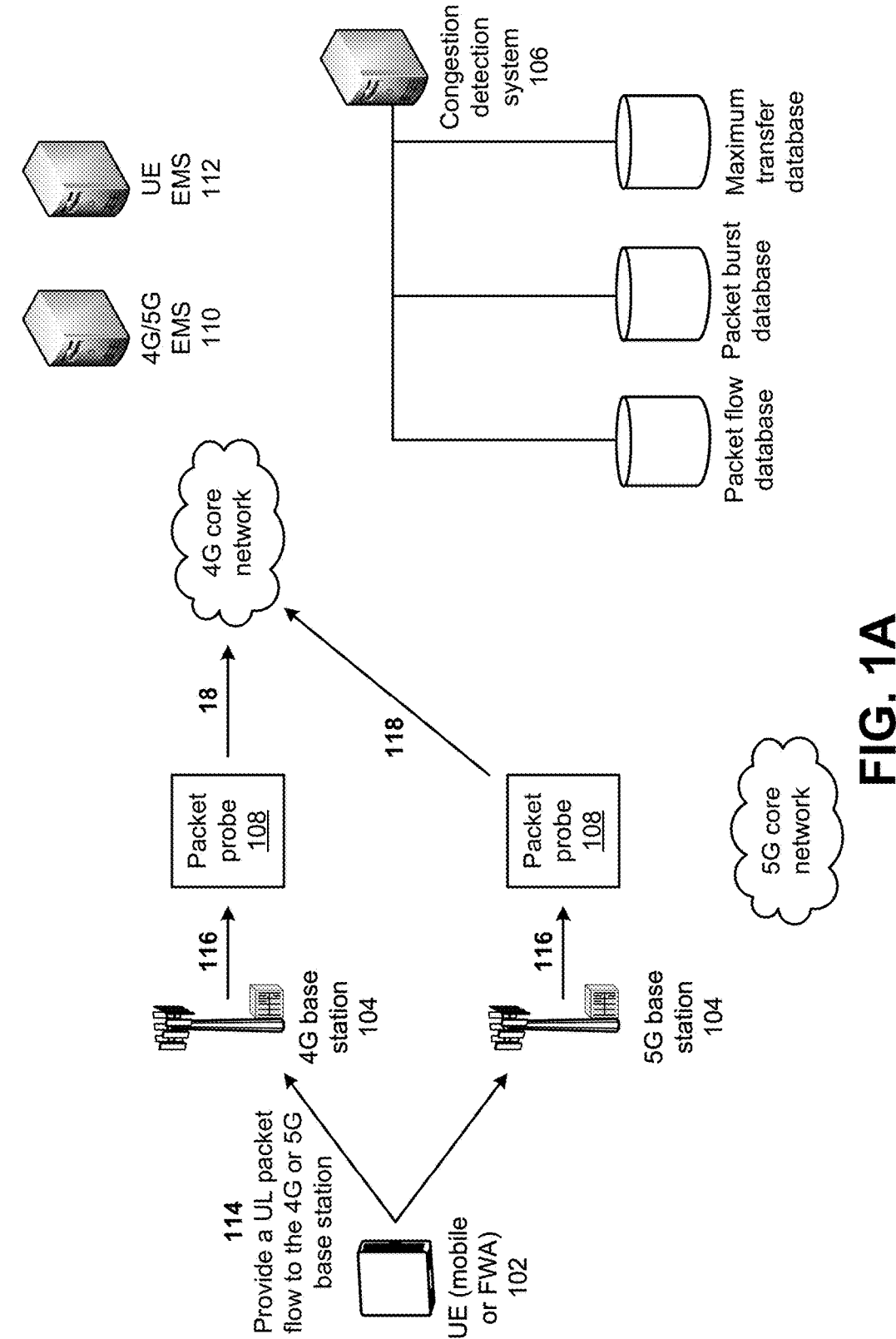

The following detailed description of example implementations refers to the accompanying drawings. The same reference numbers in different drawings may identify the same or similar elements.

A UE may be an FWA that is stationary or a mobile UE that is capable of switching locations. An FWA UE may have a fixed uplink maximum performance to a 4G base station or a 5G base station. For example, an FWA UE may have a maximum uplink speed to a 4G base station or a 5G base station of ten (10) megabits per second (Mbps). However, since a mobile UE may move, an uplink performance of the mobile UE to a 4G base station or a 5G base station may dynamically change. An uplink transmission from a UE to a 4G base station or a 5G base station is controlled by the airlink scheduler of the 4G base station or the 5G base station. The airlink scheduler may include a fixed scheduling interval (e.g., one millisecond). For every scheduling interval, the airlink scheduler may determine (e.g., for UEs that have data to send in the uplink) which UE can send data and how much data the UE can send in the scheduling interval. If only one UE has data to send, the airlink scheduler may allow the UE to use up all of the data that the UE is allowed to send (e.g., the UE is sending at a maximum uplink performance). During congestion, the FWA UE will send data at below maximum uplink performance and the airlink scheduler may spread transmissions from the FWA UE across multiple scheduling intervals until all data is sent. However, the airlink scheduler is unable to determine whether the FWA UE is facing uplink congestion from the base station, and is unable to detect an actual delay faced by the FWA UE device when congestion occurs.

Thus, current techniques for scheduling uplink transmissions consume computing resources (e.g., processing resources, memory resources, communication resources, and/or the like), networking resources, and/or other resources associated with disrupting an uplink transmission for a UE during times of congestion, causing a poor user experience for a user of a UE due to disrupting the uplink transmission for the UE, delaying the uplink transmission for the UE during times of congestion, and/or the like.

Some implementations described herein provide a congestion detection system that detects FWA uplink congestion with a packet probe. For example, the congestion detection system may receive, from a packet probe, an uplink packet flow of packets provided to a base station by a user equipment, and may add bytes (e.g., of data) for the packets of the uplink packet flow in each scheduling interval of multiple scheduling intervals. The congestion detection system may group the packets into bursts based on the multiple scheduling intervals and based on adding the bytes for the packets, and may calculate a transfer speed of each of the bursts. The congestion detection system may calculate a maximum transfer speed for the bursts based on the transfer speed of each of the bursts, and may calculate a congestion delay for each of the bursts based on the maximum transfer speed for the bursts. The congestion detection system may perform one or more actions based on the congestion delay for each of the bursts.

In this way, the congestion detection system detects FWA uplink congestion with a packet probe. For example, the congestion detection system may process an actual uplink packet flow (e.g., provided by a packet probe) to detect a maximum uplink transfer speed with zero congestion, and may process the actual uplink packet flow and a flow analysis to detect a maximum uplink transfer speed based on radio frequency conditions experienced by the UE. The congestion detection system may utilize the maximum uplink transfer speed to calculate a congestion delay of each burst experienced by the UE. The congestion detection system may be utilized with FWA UEs, with mobile UEs that remain connected to the same base station for a significant amount of time (e.g., as compared to a scheduling interval), with network slicing models where constraints might be different for various slices, and/or the like. Thus, the congestion detection system may conserve computing resources, networking resources, and/or other resources that would have otherwise been consumed by disrupting an uplink transmission for a UE during times of congestion, causing a poor user experience for a user of a UE due to disrupting the uplink transmission for the UE, delaying the uplink transmission for the UE during times of congestion, and/or the like.

FIGS. 1A-1F are diagrams of an example 100 associated with detecting FWA uplink congestion with a packet probe. As shown in FIGS. 1A-1F, example 100 includes a UE 102 (e.g., a mobile UE or an FWA UE) associated with a 5G base station 104 that includes an anchor relationship with a 4G base station 104 (e.g., in 5G NSA) or no relationship with the 4G base station 104 (e.g., in 5G standalone (SA)). Example 100 also includes a congestion detection system 106 associated with a plurality of data structures (e.g., databases, tables, lists, and/or the like), such as a packet flow database, a packet burst database, and a maximum transfer database. The 4G base station 104 may be associated with a packet probe 108 and a 4G core network. The 5G base station 104 may be associated with a packet probe 108 and a 5G core network. Example also includes a 4G/5G element management system (EMS) associated with the 4G base station 104 and the 5G base station 104, and a UE EMS associated with the UE 102. Further details of the UE 102, the base stations 104, the congestion detection system 106, the packet flow database, the packet burst database, the maximum transfer database, the packet probes 108, the 4G core network, the 5G core network, the 4G/5G EMS 110, and the UE EMS 112 are provided elsewhere herein.

Implementations are described herein in connection with 5G NSA and 5G SA. However, an implementation associated with 5G NSA may be utilized with 5G SA by replacing references to 4G base stations with references to primary 5G base stations and by replacing references to 5G base stations (e.g., anchored to 4G base stations in 5G NSA) with references to secondary 5G base stations (e.g., anchored to primary 5G base stations in 5G SA).

FIG. 1A is associated with a 5G NSA configuration. As shown in FIG. 1A, and by reference number 114, the UE 102 may provide an uplink (UL) packet flow to the 4G base station 104 or the 5G base station 104. For example, in some implementations, the UE 102 may generate UL traffic (e.g., the UL packet flow destined for the Internet) and may provide the UL packet flow to the 4G base station 104 or the 5G base station 104.

As further shown in FIG. 1A, and by reference number 116, the packet probes 108 corresponding to the 4G base station 104 and the 5G base station 104, may intercept the UL packet flow from the 4G base station 104 and the 5G base station 104. For example, in some embodiments, the packet probes 108 may monitor user plane traffic between the 4G base station 104 and the 4G core network or between the 5G base station 104 and the 4G core network. The packet probes 108 may provide transport layer (Layer 4) visibility. When the 4G base station 104 or the 5G base station 104 provides the UL packet flow to the 4G core network, the packet probes 108 associated with the 4G base station 104 or the 5G base station 104 may intercept the UL packet flow. Alternatively, the 4G base station 104 or the 5G base station 104 may provide the UL packet flow directly to one of the packet probes 108.

As further shown in FIG. 1A, and by reference number 118, the packet probes 108 may intercept the UL packet flow provided to the 4G core network. For example, the 4G base station 104 or the 5G base station 104 may provide the UL packet flow to the 4G core network, while the packet probes 108 intercept the UL packet flow. Alternatively, when the 4G base station 104 or the 5G base station 104 provides the UL packet flow directly to one of the packet probes 108, the one of the packet probes 108 may provide the UL packet flow to the 4G core network.

Figure 1B:
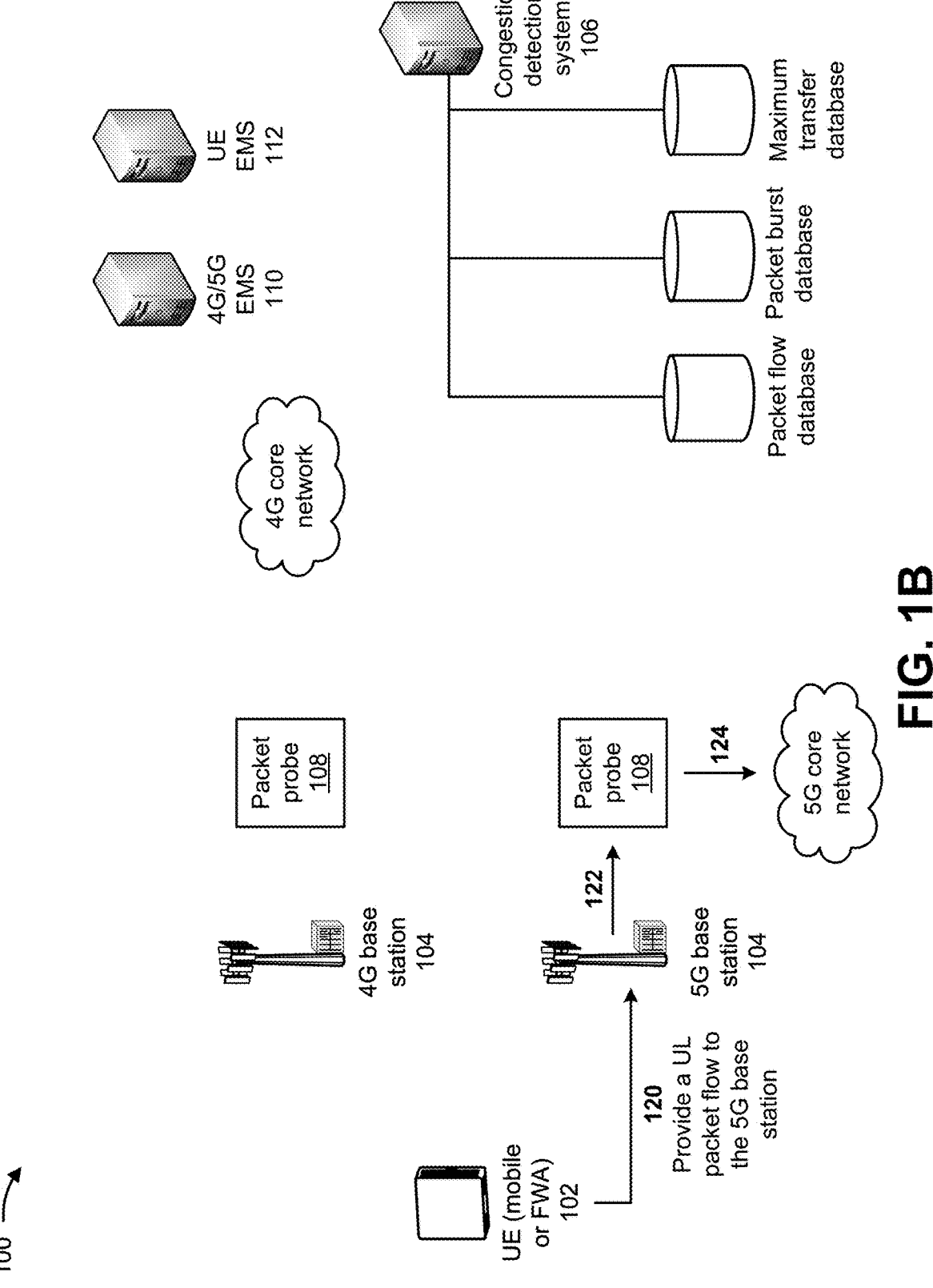

FIG. 1B is associated with a 5G SA configuration. As shown in FIG. 1B, and by reference number 120, the UE 102 may provide a UL packet flow to the 5G base station 104. For example, in some implementations, the UE 102 may generate UL traffic (e.g., the UL packet flow destined for the Internet) and may provide the UL packet flow to only the 5G base station 104 in the 5G SA configuration.

As further shown in FIG. 1B, and by reference number 122, the packet probe 108 corresponding to the 5G base station 104, may intercept the UL packet flow from the 5G base station 104. For example, the packet probe 108 may monitor user plane traffic between the 5G base station 104 and the 5G core network. When the 5G base station 104 provides the UL packet flow to the 5G core network, the packet probe 108 associated with the 5G base station 104 may intercept the UL packet flow. Alternatively, the 5G base station 104 may provide the UL packet flow directly to the packet probe 108.

As further shown in FIG. 1B, and by reference number 124, the packet probe 108 may intercept the UL packet flow provided to the 5G core network. For example, the 5G base station 104 may provide the UL packet flow to the 5G core network, while the packet probe 108 intercepts the UL packet flow. Alternatively, when the 5G base station 104 provides the UL packet flow directly to the packet probe 108, the packet probe 108 may provide the UL packet flow to the 5G core network.

Figure 1C:
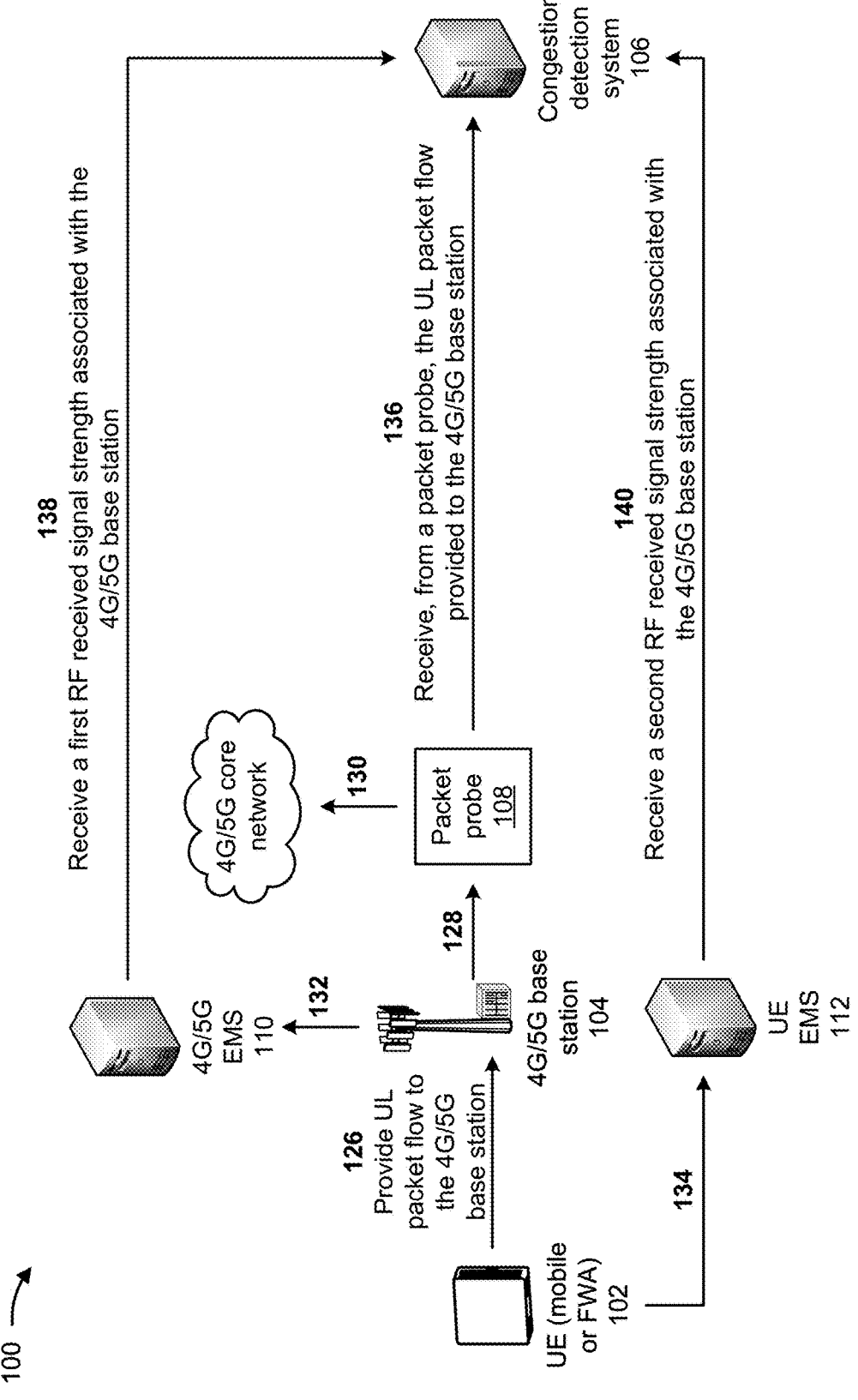

FIG. 1C depicts an arrangement that may be utilized with a 5G NSA configuration or a 5G SA configuration. As shown in FIG. 1C, and by reference number 126, the UE 102 may provide a UL packet flow to the 4G base station 104 or the 5G base station 104. For example, in some implementations, the UE 102 may generate UL traffic (e.g., the UL packet flow destined for the Internet) and may provide the UL packet flow to the 4G base station 104 or the 5G base station 104.

As further shown in FIG. 1C, and by reference number 128, the 4G base station 104 or the 5G base station 104 may provide the UL packet flow to the packet probe 108. For example, the packet probes 108 may monitor user plane traffic between the 4G base station 104 and the 4G core network or between the 5G base station 104 and the 5G core network. When the 4G base station 104 or the 5G base station 104 provides the UL packet flow to the 4G core network or the 5G core network, the packet probes 108 associated with the 4G base station 104 or the 5G base station 104 may receive the UL packet flow. Alternatively, the 4G base station 104 or the 5G base station 104 may provide the UL packet flow directly to one of the packet probes 108.

As further shown in FIG. 1C, and by reference number 130, the packet probe 108 may provide the UL packet flow to the 4G core network or the 5G core network. For example, the 4G base station 104 or the 5G base station 104 may provide the UL packet flow to the 4G core network or the 5G core network. Alternatively, when the 4G base station 104 or the 5G base station 104 provides the UL packet flow directly to the packet probe 108, the packet probe 108 may provide the UL packet flow to the 4G core network or the 5G core network.

As further shown in FIG. 1C, and by reference number 132, the 4G base station 104 or the 5G base station 104 may provide the UL packet flow to the 4G/5G EMS 110. For example, when the 4G base station or the 5G base station is associated with the 4G/5G EMS 110, the 4G base station 104 or the 5G base station 104 may also provide the UL packet flow to the 4G/5G EMS 110.

As further shown in FIG. 1C, and by reference number 134, the UE 102 may provide the UL packet flow to the UE EMS 112. For example, when the UE 102 is associated with the UE EMS 112, the UE 102 may also provide the UL packet flow to the UE EMS 112.

As further shown in FIG. 1C, and by reference number 136, the congestion detection system 106 may receive, from the packet probe 108, the UL packet flow provided to the 4G base station 104 or the 5G base station 104. For example, the packet probe 108 may provide the UL packet flow (e.g., provided to the 4G base station 104 or the 5G base station 104) to the congestion detection system 106, and the congestion detection system 106 may receive the UL packet flow from the packet probe 108. In some implementations, the congestion detection system 106 may continuously receive the UL packet flow from the packet probe 108, may periodically receive the UL packet flow from the packet probe 108, may receive the UL packet flow from the packet probe 108 based on providing a request for the UL packet flow to the packet probe 108, and/or the like. In some implementations, the congestion detection system 106 may store the UL packet flow in a data structure (e.g., a database, a table, a list, and/or the like) associated with the congestion detection system 106.

As further shown in FIG. 1C, and by reference number 138, the congestion detection system 106 may receive a first radio frequency (RF) received signal strength associated with the 4G base station 104 or the 5G base station 104. For example, the 4G/5G EMS 110 may calculate the first RF received signal strength associated with the 4G base station 104 or the 5G base station 104 based on the UL traffic flow. The 4G/5G EMS 110 may provide the first RF received signal strength associated with the 4G base station 104 or the 5G base station 104 to the congestion detection system 106, and the congestion detection system 106 may receive the first RF received signal strength from the 4G/5G EMS 110. In some implementations, the congestion detection system 106 may continuously receive the first RF received signal strength from the 4G/5G EMS 110, may periodically receive the first RF received signal strength from the 4G/5G EMS 110, may receive the first RF received signal strength from the 4G/5G EMS 110 based on providing a request for the first RF received signal strength to the 4G/5G EMS 110, and/or the like. In some implementations, the congestion detection system 106 may store the first RF received signal strength in the data structure associated with the congestion detection system 106.

As further shown in FIG. 1C, and by reference number 140, the congestion detection system 106 may receive a second RF received signal strength associated with the 4G base station 104 and the 5G base station 104. For example, the UE EMS 112 may calculate the second RF received signal strength associated with the 4G base station 104 or the 5G base station 104 based on the UL traffic flow. The UE EMS 112 may provide the second RF received signal strength associated with the 4G base station 104 or the 5G base station 104 to the congestion detection system 106, and the congestion detection system 106 may receive the second RF received signal strength from the UE EMS 112. In some implementations, the congestion detection system 106 may continuously receive the second RF received signal strength from the UE EMS 112, may periodically receive the second RF received signal strength from the UE EMS 112, may receive the second RF received signal strength from the UE EMS 112 based on providing a request for the second RF received signal strength to the UE EMS 112, and/or the like. In some implementations, the congestion detection system 106 may store the second RF received signal strength in the data structure associated with the congestion detection system 106.

FIG. 1D depicts example data stored in the packet flow database, the packet burst database, and the maximum transfer database. As shown, the packet flow database may include an identifier (ID) of the 4G base station 104 (eNB) associated with a UL packet flow, an ID of the 5G base station 104 (gNB) associated with a UL packet flow, a mobile directory number (MDN) of the UE 102 associated with the UL packet flow, a time associated with a UL packet flow, a number of bytes associated with a UL packet flow, and/or the like.

As further shown in FIG. 1D, the packet burst database may include an ID of the 4G base station 104 (eNB) associated with a UL packet flow, an ID of the 5G base station 104 (gNB) associated with a UL packet flow, an MDN of the UE 102 associated with the UL packet flow, a start time associated with a UL packet flow, an end time associated with a UL packet flow, a burst length associated with a UL packet flow, a number of bytes associated with a UL packet flow, an RF signal strength associated with a UL packet flow, a transfer speed associated with UL packet flow, a congestion delay associated with a UL packet flow, and/or the like. The RF signal strength may be provided via a reference signal received power (RSRP), a reference signal received quality (RSRQ), and/or a signal-to-interference-and-noise ratio (SINR).

As further shown in FIG. 1D, the maximum transfer database may include an ID of the 4G base station 104 (eNB) associated with a UL packet flow, an ID of the 5G base station 104 (gNB) associated with a UL packet flow, an MDN of the UE 102 associated with the UL packet flow, an RF signal strength associated with a UL packet flow, a maximum transfer speed associated with UL packet flow, and/or the like. The RF signal strength may be provided via an RSRP, an RSRQ, and/or an SINR.

Figure 1E:
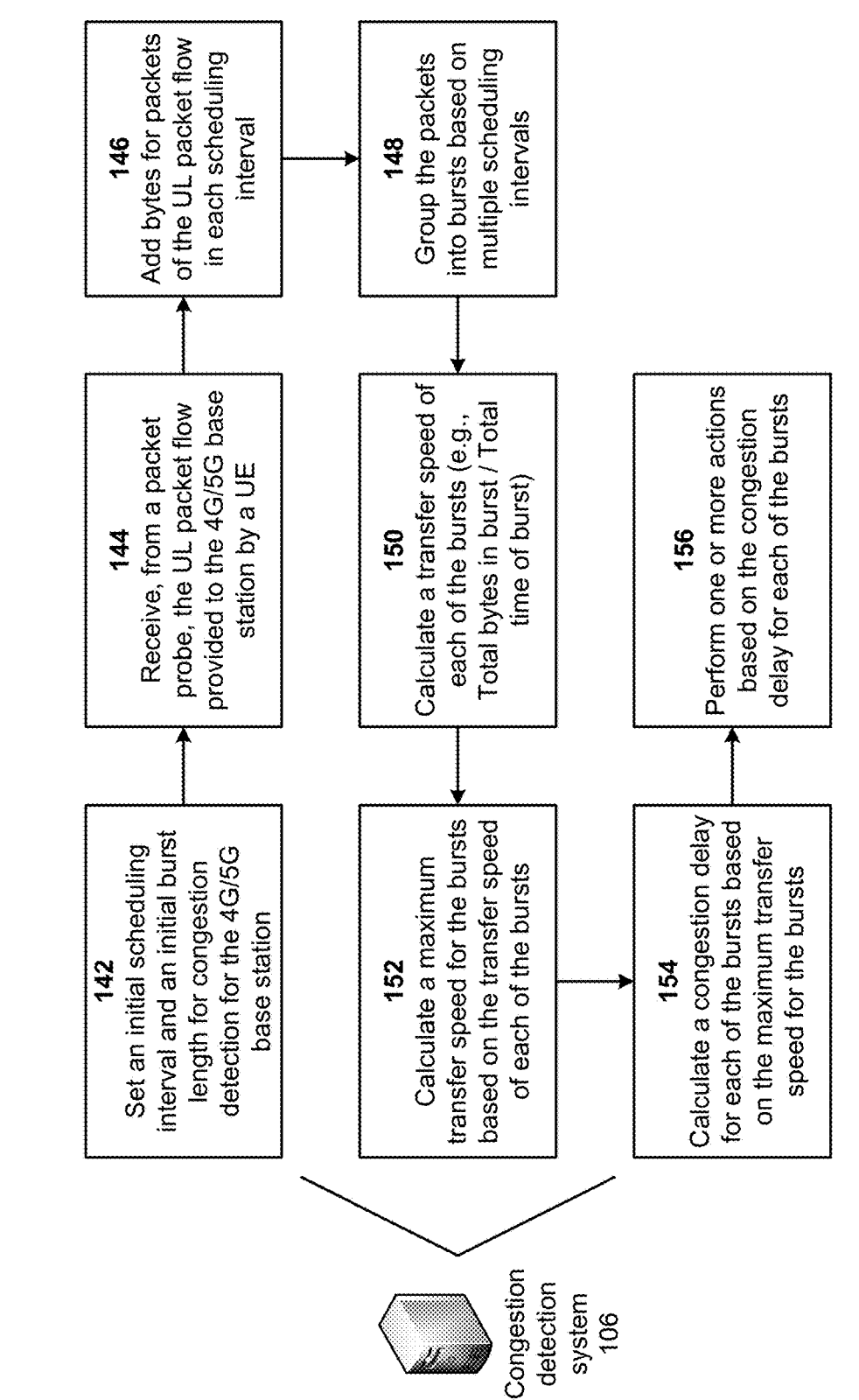

FIG. 1E depicts a flow diagram associated with calculating congestion delay without RF signal information. As shown in FIG. 1E, and by reference number 142, the congestion detection system 106 may set an initial scheduling interval and an initial burst length for congestion detection for the 4G base station 104 or the 5G base station 104. For example, the congestion detection system 106 may set the initial scheduling interval (Ts) for the 4G base station 104 or the 5G base station 104 (e.g., in milliseconds, seconds, and/or the like). The congestion detection system 106 may also set the initial minimum burst length for congestion detection (Bmin) for the 4G base station 104 or the 5G base station 104 (e.g., a multiple of the initial scheduling interval).

As further shown in FIG. 1E, and by reference number 144, the congestion detection system 106 may receive, from the packet probe 108, the UL packet flow provided to the 4G base station 104 or the 5G base station 104 by the UE 102. For example, the packet probe 108 may provide the UL packet flow (e.g., provided to the 4G base station 104 or the 5G base station 104) to the congestion detection system 106, and the congestion detection system 106 may receive the UL packet flow from the packet probe 108. In some implementations, the congestion detection system 106 may continuously receive the UL packet flow from the packet probe 108, may periodically receive the UL packet flow from the packet probe 108, may receive the UL packet flow from the packet probe 108 based on providing a request for the UL packet flow to the packet probe 108, and/or the like.

As further shown in FIG. 1E, and by reference number 146, the congestion detection system 106 may add bytes for packets of the UL packet flow in each scheduling interval. For example, the UL packet flow may include packets with a quantity of bytes of data. The congestion detection system 106 may define multiple scheduling intervals for the packets of the UL packet flow. The congestion detection system 106 may add the quantity of bytes of data for the packets of the UL packet flow in each of the multiple scheduling intervals defined for the packets of the UL packet flow.

As further shown in FIG. 1E, and by reference number 148, the congestion detection system 106 may group the packets into bursts based on multiple scheduling intervals. For example, the congestion detection system 106 may group multiple scheduling intervals together, and may group the packets of the UL packet flow corresponding to the groups of the multiple scheduling intervals. The groups of packets of the UL packet flow corresponding to the groups of multiple scheduling intervals may be referred to as bursts.

As further shown in FIG. 1E, and by reference number 150, the congestion detection system 106 may calculate a transfer speed of each of the bursts. For example, the congestion detection system 106 may calculate a transfer speed of each of the bursts according to the following equation:

$$\text{Transfer speed} = (\text{Total bytes in a burst})/(\text{Total time of the burst}).$$

The transfer speed of each of the bursts may be defined as a ratio of a total amount of bytes in a burst transferred between two points (e.g., the UE 102 and the 4G base station 104 or the 5G base station 104) in a defined period of time (e.g., the total time of the burst).

As further shown in FIG. 1E, and by reference number 152, the congestion detection system 106 may calculate a maximum transfer speed for the bursts based on the transfer speed of each of the bursts. For example, the congestion detection system 106 may analyze the transfer speeds of the bursts, and may identify the maximum transfer speed (Tmax) for the bursts based on analyzing the transfer speeds of the bursts. In some implementations, the maximum transfer speed for the bursts may be the greatest transfer speed of the bursts.

As further shown in FIG. 1E, and by reference number 154, the congestion detection system 106 may calculate a congestion delay for each of the bursts based on the maximum transfer speed for the bursts. For example, the congestion detection system 106 may calculate the congestion delay for each of the bursts based on the following procedure. If a burst length of a burst is less than the initial minimum burst length, the congestion detection system 106 may determine that the congestion delay is zero. If a burst length of a burst is greater than or equal to the initial minimum burst length, the congestion detection system 106 may calculate a minimum transfer speed (Tmin) based on the following equation:

$$T\text{min} = \text{Roundup}(\text{Total bytes in a burst}/T\text{max}, 0).$$

The congestion detection system 106 may then calculate the congestion delay by subtracting the minimum transfer time from the burst length (e.g., Congestion delay=Burst length−Tmin).

As further shown in FIG. 1E, and by reference number 156, the congestion detection system 106 may perform one or more actions based on the congestion delay for each of the bursts. For example, when performing the one or more actions based on the congestion delay, the congestion detection system 106 may generate a notification about the congestion delay, and may provide the notification to a network operator. In some implementations, when performing the one or more actions based on the congestion delay, the congestion detection system 106 may dispatch a technician to service a network device associated with the congestion delay. In some implementations, when performing the one or more actions based on the congestion delay, the congestion detection system 106 may dispatch an autonomous vehicle to service a network device associated with the congestion delay. In some implementations, when performing the actions based on the congestion delay, the congestion detection system 106 may attempt to load balance traffic for the 4G base station 104 and/or the 5G base station 104 to mitigate the congestion delay.

FIG. 1F depicts a flow diagram associated with calculating congestion delay with RF signal information. As shown in FIG. 1F, and by reference number 158, the congestion detection system 106 may set an initial scheduling interval and an initial burst length for congestion detection for the 4G base station 104 or the 5G base station 104. For example, the congestion detection system 106 may set the initial scheduling interval (Ts) for the 4G base station 104 or the 5G base station 104 (e.g., in milliseconds, seconds, and/or the like). The congestion detection system 106 may also set the initial minimum burst length for congestion detection (Bmin) for the 4G base station 104 or the 5G base station 104 (e.g., a multiple of the initial scheduling interval).

As further shown in FIG. 1F, and by reference number 160, the congestion detection system 106 may receive, from the packet probe 108, the UL packet flow provided to the 4G base station 104 or the 5G base station 104 by the UE 102. For example, the packet probe 108 may provide the UL packet flow (e.g., provided to the 4G base station 104 or the 5G base station 104) to the congestion detection system 106, and the congestion detection system 106 may receive the UL packet flow from the packet probe 108. In some implementations, the congestion detection system 106 may continuously receive the UL packet flow from the packet probe 108, may periodically receive the UL packet flow from the packet probe 108, may receive the UL packet flow from the packet probe 108 based on providing a request for the UL packet flow to the packet probe 108, and/or the like.

As further shown in FIG. 1F, and by reference number 162, the congestion detection system 106 may add bytes for packets of the UL packet flow in each scheduling interval. For example, the UL packet flow may include packets with a quantity of bytes and the congestion detection system 106 may define scheduling intervals for the packets of the UL packet flow. The congestion detection system 106 may add the bytes for the packets of the UL packet flow in each of the scheduling intervals defined for the packets of the UL packet flow.

As further shown in FIG. 1F, and by reference number 164, the congestion detection system 106 may group the packets into bursts based on multiple scheduling intervals. For example, the congestion detection system 106 may group multiple scheduling intervals together, and may group the packets of the UL packet flow corresponding to the groups of the multiple scheduling intervals. The groups of packets of the UL packet flow corresponding to the groups of multiple scheduling intervals may be referred to as bursts.

As further shown in FIG. 1F, and by reference number 166, the congestion detection system 106 may calculate a transfer speed of each of the bursts. For example, the congestion detection system 106 may calculate a transfer speed of each of the bursts according to the following equation:

$$\text{Transfer speed} = (\text{Total bytes in a burst})/(\text{Total time of the burst}).$$

The transfer speed of each of the bursts may be defined as a ratio of a total amount of bytes in a burst transferred between two points (e.g., the UE 102 and the 4G base station 104 or the 5G base station 104) in a defined period of time (e.g., the total time of the burst).

As further shown in FIG. 1F, and by reference number 168, the congestion detection system 106 may update each of the bursts with an RF signal strength of each of the bursts. For example, the congestion detection system 106 may utilize the first RF signal strength received from the 4G/5G EMS 110 and/or the second RF signal strength received from the UE EMS 112 to update each of the bursts (e.g., to modify each of the bursts with the RF signal strength).

As further shown in FIG. 1F, and by reference number 170, the congestion detection system 106 may calculate a maximum transfer speed for the bursts based on the transfer speed of each of the bursts and based on updating each of the bursts with the RF signal strength (Tmax(RF)). For example, the congestion detection system 106 may analyze the transfer speeds of the bursts (e.g., as modified based on updating each of the bursts with the RF signal strength), and may identify the maximum transfer speed for the bursts based on analyzing the transfer speeds of the bursts (e.g., as modified) . In some implementations, the maximum transfer speed for the bursts may be the greatest transfer speed of the bursts (e.g., after modification based on updating each of the bursts with the RF signal strength).

As further shown in FIG. 1F, and by reference number 172, the congestion detection system 106 may calculate a congestion delay for each of the bursts based on the maximum transfer speed for the bursts. For example, the congestion detection system 106 may calculate the congestion delay for each of the bursts based on the following procedure. If a burst length of a burst is less than the initial minimum burst length, the congestion detection system 106 may determine that the congestion delay is zero. If a burst length of a burst is greater than or equal to the initial minimum burst length, the congestion detection system 106 may calculate a minimum transfer speed (Tmin) based on the following equation:

$$Tmin = Roundup(Total\ bytes\ in\ a\ burst/Tmax(RF), 0).$$

The congestion detection system 106 may then calculate the congestion delay by subtracting the minimum transfer time from the burst length (e.g., Congestion delay=Burst length–Tmin). In some implementations, when calculating the congestion delay for each of the bursts, the congestion detection system 106 may perform a transmission control protocol (TCP) congestion control analysis to calculate the congestion delay for each of the bursts. In some implementations, when calculating the congestion delay for each of the bursts, the congestion detection system 106 may identify missing packets in the uplink packet flow to calculate the congestion delay for each of the bursts.

As further shown in FIG. 1F, and by reference number 174, the congestion detection system 106 may perform one or more actions based on the congestion delay for each of the bursts. For example, when performing the one or more actions based on the congestion delay, the congestion detection system 106 may generate a notification about the congestion delay, and may provide the notification to a network operator. In some implementations, when performing the one or more actions based on the congestion delay, the congestion detection system 106 may dispatch a technician to service a network device associated with the congestion delay. In some implementations, when performing the one or more actions based on the congestion delay, the congestion detection system 106 may dispatch an autonomous vehicle to service a network device associated with the congestion delay.

In a first example, the UE 102 may have a maximum UL speed of eight megabits per second (Mbps) or one thousand (1000) bytes per millisecond (ms). The initial scheduling interval (Ts) may be one millisecond and the initial burst length (Bmin) may be 5*Ts or five milliseconds. If there is a burst of length three milliseconds and two thousand (2000) bytes, the burst is shorter than Bmin (five milliseconds) and the congestion detection system 106 may determine that the congestion delay cannot be detected (e.g., congestion delay=zero). With a burst that is too short, the last Ts interval may only be partially filled because of insufficient data. Hence, the calculation congestion delay for a burst that is too short may lead to a false positive detection of congestion delay.

In a second example, the UE 102 may have a maximum UL speed of eight Mbps or one thousand (1000) bytes per millisecond. The initial scheduling interval (Ts) may be one millisecond and the initial burst length (Bmin) may be 5*Ts or five milliseconds. If there is a burst of length five milliseconds and two thousand (2000) bytes, the burst is equal to Bmin (five milliseconds) and the congestion detection system 106 may calculate Tmin=2000/1000=2 ms and a congestion delay of 5 ms–2 ms=3 ms.

In a third example, the UE 102 may have a maximum UL speed of eight Mbps or one thousand (1000) bytes per millisecond. The initial scheduling interval (Ts) may be one millisecond and the initial burst length (Bmin) may be 5*Ts or five milliseconds. If there is a burst of length five milliseconds and one thousand five hundred (1500) bytes, the burst is equal to Bmin (five milliseconds) and the congestion detection system 106 may calculate Tmin=1500/1000=1.5 ms (e.g., rounded up to 2 ms) and a congestion delay of 5 ms–2 ms=3 ms.

In a fourth example, the UE 102 may have a maximum UL speed of sixteen Mbps or two thousand (2000) bytes per millisecond. The initial scheduling interval (Ts) may be one millisecond and the initial burst length (Bmin) may be 5*Ts or five milliseconds. If there is a burst of length five milliseconds and six thousand (6000) bytes, the burst is equal to Bmin (five milliseconds) and the congestion detection system 106 may calculate Tmin=6000/2000=3 ms and a congestion delay of 5 ms–3 ms=2 ms.

In some implementations, the congestion detection system 106 may utilize an actual UL packet flow to detect a maximum UL transfer speed with zero congestion. The congestion detection system 106 may utilize the actual UL packet capture and flow analysis to detect a maximum UL transfer speed with real world RF conditions by the UE 102. The congestion detection system 106 may utilize the maximum UL transfer speed to calculate the congestion delay of each burst experienced by the UE 105. Implementations described herein may be utilized with a mobile UE 102 that stays connected to the same 4G base station 104 or 5G base station 104 for a significant amount of time as compared to a scheduling interval, may be utilized with network slicing models where the constraints might be different for various slices, and/or the like.

In some implementations, the congestion detection system 106 may detect UE 102 and base station 104 UL airlink congestion based on by packet flow, and may dynamically adapt to each UE 102's latest RF environment by calculating a maximum transfer speed for each RF signal strength combination. The congestion detection system 106 may utilize actual packet traffic to detect actual congestion delay experienced by the UE 105. The congestion detection system 106 may utilize the minimum burst length to avoid false positive detection of congestion delay of impartial filled scheduling intervals, and may provide a congestion delay estimate for each UL burst of production traffic.

In this way, the congestion detection system 106 detects FWA uplink congestion with a packet probe 108. For example, the congestion detection system 106 may process an actual uplink packet flow to detect maximum uplink transfer speed with zero congestion, and may process the actual uplink packet flow and a flow analysis to detect a maximum uplink transfer speed based on radio frequency conditions experienced by the UE 102. The congestion detection system 106 may utilize the maximum uplink transfer speed to calculate a congestion delay of each burst experienced by the UE 102. The congestion detection system 106 may be utilized with FWA UEs 102, with mobile UEs 102 that remain connected to the same base station for a significant amount of time (e.g., as compared to a scheduling interval), with network slicing models where constraints might be different for various slices, and/or the like. Thus, the congestion detection system 106 may conserve computing resources, networking resources, and/or other resources that would have otherwise been consumed by disrupting an uplink transmission for a UE during times of congestion, causing a poor user experience for a user of a UE due to disrupting the uplink transmission for the UE, delaying the uplink transmission for the UE during times of congestion, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
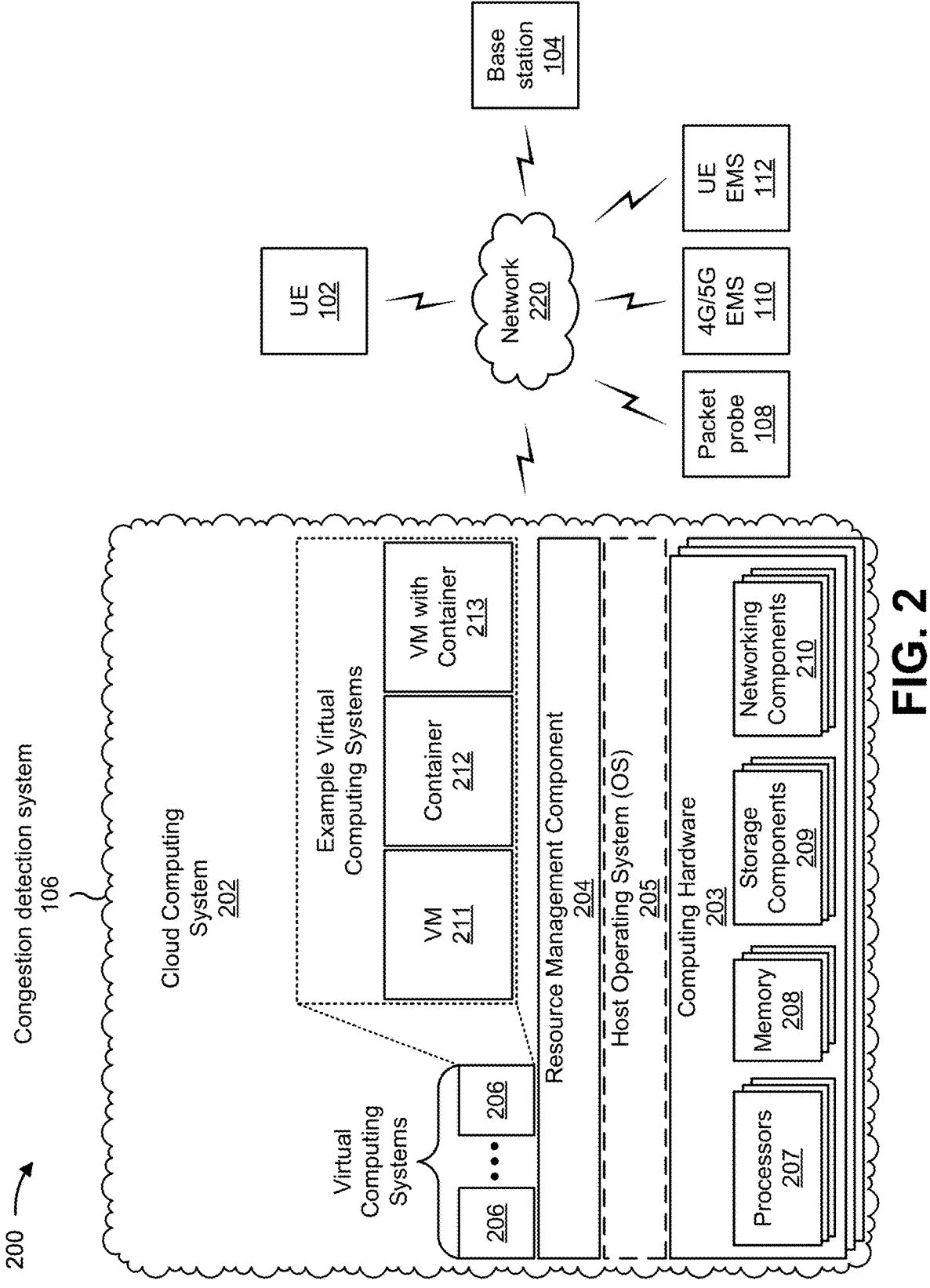
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the congestion detection system 106, which may include one or more elements of and/or may execute within a cloud computing system 202. The cloud computing system 202 may include one or more elements 203-213, as described in more detail below. As further shown in FIG. 2, the environment 200 may include the UE 102, the base station 104, the packet probe 108, the 4G/5G EMS 110, the UE EMS 112, and/or a network 220. Devices and/or elements of the environment 200 may interconnect via wired connections and/or wireless connections.

The UE 102 includes one or more devices capable of receiving, generating, storing, processing, and/or providing information, such as information described herein. For example, the UE 102 may include a mobile hotspot device, an FWA device, a customer premise equipment (CPE), an FWA channel service unit, an FWA data service unit, an FWA router, an FWA wireless access point (WAP) device, an FWA modem, an FWA set-top box, or a similar type of device. The UE may provide wireless connectivity through radio links between two fixed points. In other words, the UE may provide wireless Internet access to homes or businesses without laying fiber and cables to provide last mile connectivity.

The base station 104 includes one or more devices capable of transferring traffic, such as audio, video, text, and/or other traffic, destined for and/or received from a user equipment (UE). For example, the base station 104 may include an eNodeB (eNB) associated with a long term evolution (LTE) network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 104 may support, for example, a cellular radio access technology (RAT). The base station 104 may transfer traffic between a UE (e.g., using a cellular RAT), one or more other base stations 104 (e.g., using a wireless interface or a backhaul interface, such as a wired backhaul interface), and/or a core network. The base station 104 may provide one or more cells that cover geographic areas.

The packet probe 108 includes one or more devices capable of receiving, generating, storing, processing, and/or providing information, such as information described herein. For example, the packet probe 108 may include a sniffer device, a device capable of data dumps, a virtual probe, and/or the like. In some implementations, the packet probe 108 may poll uplink packet flows from the base station 104, and may provide the uplink packet flows to a 4G core network, a 5G core network, the congestion detection system 106, and/or the like.

The 4G/5G EMS 110 may include one or more devices capable of receiving, generating, storing, processing, providing, and/or routing information, as described elsewhere herein. The 4G/5G EMS 110 may include a communication device and/or a computing device. For example, the 4G/5G EMS 110 may include a server, such as an application server, a client server, a web server, a database server, a host server, a proxy server, a virtual server (e.g., executing on computing hardware), or a server in a cloud computing system. In some implementations, the 4G/5G EMS 110 may include computing hardware used in a cloud computing environment. In some implementations, the 4G/5G EMS 110 may manage specific types of one or more network elements within a telecommunication network, such as one or more base stations 104.

The UE EMS 112 may include one or more devices capable of receiving, generating, storing, processing, providing, and/or routing information, as described elsewhere herein. The UE EMS 112 may include a communication device and/or a computing device. For example, the UE EMS 112 may include a server, such as an application server, a client server, a web server, a database server, a host server, a proxy server, a virtual server (e.g., executing on computing hardware), or a server in a cloud computing system. In some implementations, the UE EMS 112 may include computing hardware used in a cloud computing environment. In some implementations, the UE EMS 112 may manage specific types of one or more network elements within a telecommunication network, such as one or more UEs 102.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the congestion detection system 106 may include one or more elements 203-213 of the cloud computing system 202, may execute within the cloud computing system 202, and/or may be hosted within the cloud computing system 202, in some implementations, the congestion detection system 106 may not be cloud-based (e.g., may be implemented outside of a cloud computing system) or may be partially cloud-based. For example, the congestion detection system 106 may include one or more devices that are not part of the cloud computing system 202, such as the device 300 of FIG. 3, which may include a standalone server or another type of computing device. The congestion detection system 106 may perform one or more operations and/or processes described in more detail elsewhere herein.

The network 220 may include one or more wired and/or wireless networks. For example, the network 220 may include a cellular network (e.g., a 5G network, a 4G network, an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
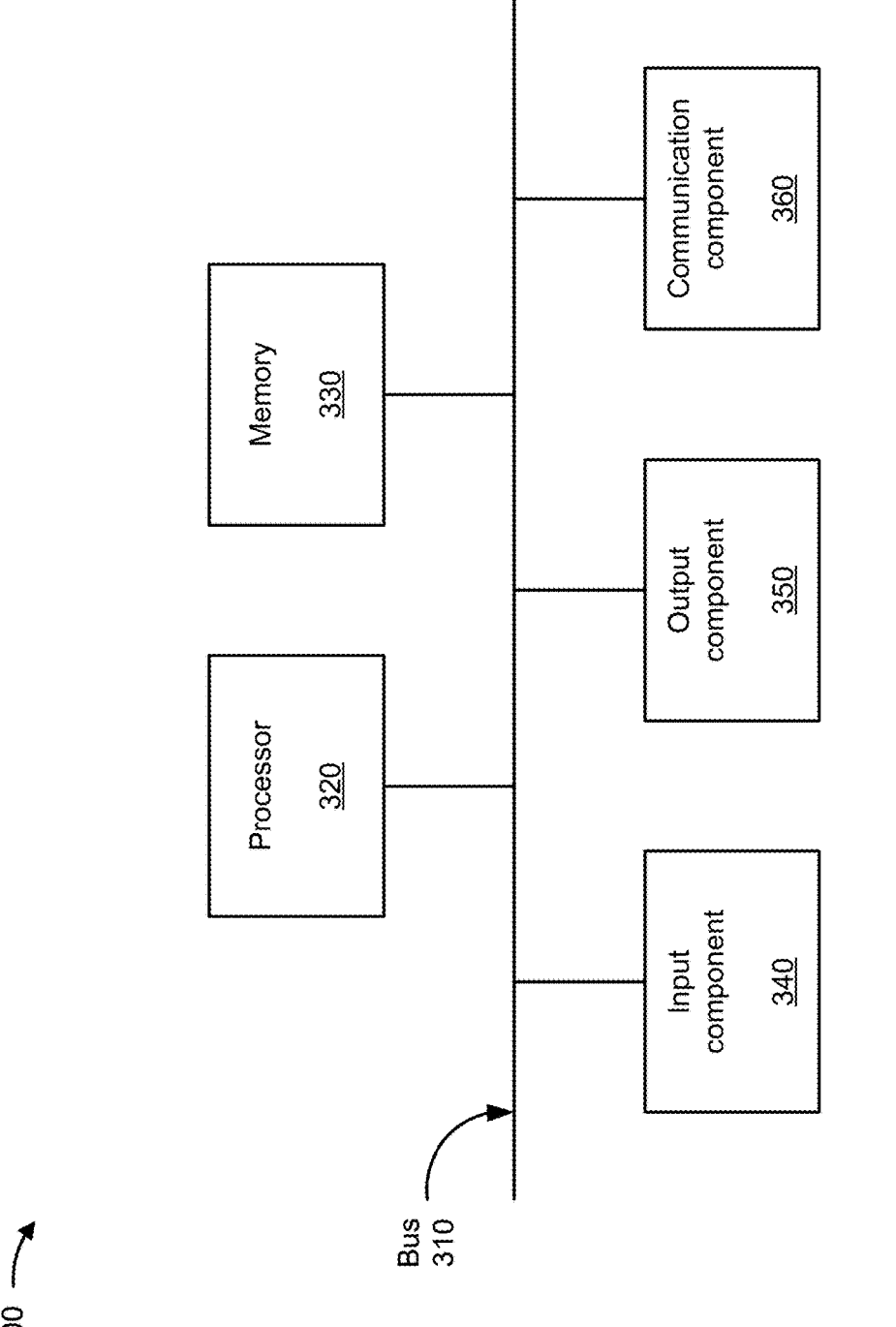
FIG. 3 is a diagram of example components of one or more devices of FIG. 2.

FIG. 3 is a diagram of example components of a device 300, which may correspond to the UE 102, the base station 104, the congestion detection system 106, the packet probe 108, the 4G/5G EMS 110, and/or the UE EMS 112. In some implementations, the UE 102, the base station 104, the congestion detection system 106, the packet probe 108, the 4G/5G EMS 110, and/or the UE EMS 112 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a lightemitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for detecting FWA uplink congestion with a packet probe. In some implementations, one or more process blocks of FIG. 4 may be performed by a device (e.g., the congestion detection system 106). In some implementations, one or more process blocks of FIG. 4 may be performed by another device or a group of devices separate from or including the device, such as an UE (e.g., the UE 102) and/or a base station (e.g., the base station 104). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a packet probe, an uplink packet flow provided to a base station by a user equipment (block 410). For example, the device may receive, from a packet probe, an uplink packet flow provided to a base station by a user equipment, as described above. In some implementations, the base station is one of a fourth-generation base station or a fifth-generation base station. In some implementations, the user equipment is a fixed wireless access user equipment or a mobile user equipment connected to the base station for a time period. In some implementations, the uplink packet flow is user plane traffic provided from the user equipment to a core network, via the base station.

As further shown in FIG. 4, process 400 may include adding bytes for packets of the uplink packet flow in each scheduling interval of multiple scheduling intervals (block 420). For example, the device may add bytes for packets of the uplink packet flow in each scheduling interval of multiple scheduling intervals, as described above.

As further shown in FIG. 4, process 400 may include grouping the packets into bursts based on the multiple scheduling intervals and based on adding the bytes for the packets (block 430). For example, the device may group the packets into bursts based on the multiple scheduling intervals and based on adding the bytes for the packets, as described above.

As further shown in FIG. 4, process 400 may include calculating a transfer speed of each of the bursts (block 440). For example, the device may calculate a transfer speed of each of the bursts, as described above.

As further shown in FIG. 4, process 400 may include calculating a maximum transfer speed for the bursts based on the transfer speed of each of the bursts (block 450). For example, the device may calculate a maximum transfer speed for the bursts based on the transfer speed of each of the bursts, as described above.

As further shown in FIG. 4, process 400 may include calculating a congestion delay for each of the bursts based on the maximum transfer speed for the bursts (block 460). For example, the device may calculate a congestion delay for each of the bursts based on the maximum transfer speed for the bursts, as described above. In some implementations, calculating the congestion delay for each of the bursts based on the maximum transfer speed for the bursts includes calculating the congestion delay for each of the bursts based on the maximum transfer speed for the bursts and based on the initial burst length. In some implementations, calculating the congestion delay for each of the bursts includes performing a transmission control protocol congestion control analysis to calculate the congestion delay for each of the bursts. In some implementations, calculating the congestion delay for each of the bursts includes identifying missing packets in the uplink packet flow to calculate the congestion delay for each of the bursts.

As further shown in FIG. 4, process 400 may include performing one or more actions based on the congestion delay for each of the bursts (block 470). For example, the device may perform one or more actions based on the congestion delay for each of the bursts, as described above. In some implementations, performing the one or more actions includes generating a notification about the congestion delay, and providing the notification to a network operator. In some implementations, performing the one or more actions includes dispatching a technician to service a network device associated with the congestion delay. In some implementations, performing the one or more actions includes dispatching an autonomous vehicle to service a network device associated with the congestion delay.

In some implementations, process 400 includes setting an initial scheduling interval and an initial burst length for calculating the congestion delay for each of the bursts. In some implementations, process 400 includes updating each of the bursts with a radio frequency signal strength of each of the bursts, and calculating the maximum transfer speed for the bursts based on the transfer speed of each of the bursts includes calculating the maximum transfer speed for the bursts based on the transfer speed of each of the bursts and based on updating each of the bursts with the radio frequency signal strength. In some implementations, process 400 includes receiving the radio frequency signal strength of each of the bursts from an element management system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device and from a packet probe, an uplink packet flow provided to a base station by a user equipment;
adding, by the device, bytes for packets of the uplink packet flow in each scheduling interval of multiple scheduling intervals;
grouping, by the device, the packets into bursts based on the multiple scheduling intervals and based on adding the bytes for the packets;
calculating, by the device, a transfer speed of each of the bursts;
calculating, by the device, a maximum transfer speed for the bursts based on the transfer speed of each of the bursts;
calculating, by the device, a congestion delay for each of the bursts based on the maximum transfer speed for the bursts; and
performing, by the device, one or more actions based on the congestion delay for each of the bursts.

2. The method of claim 1, further comprising:
setting an initial scheduling interval and an initial burst length for calculating the congestion delay for each of the bursts.

3. The method of claim 2, wherein calculating the congestion delay for each of the bursts based on the maximum transfer speed for the bursts comprises:
calculating the congestion delay for each of the bursts based on the maximum transfer speed for the bursts and based on the initial burst length.

4. The method of claim 1, further comprising:
updating each of the bursts with a radio frequency signal strength of each of the bursts,
wherein calculating the maximum transfer speed for the bursts based on the transfer speed of each of the bursts comprises:
calculating the maximum transfer speed for the bursts based on the transfer speed of each of the bursts and based on updating each of the bursts with the radio frequency signal strength.

5. The method of claim 4, further comprising:
receiving the radio frequency signal strength of each of the bursts from an element management system.

6. The method of claim 1, wherein the base station is one of a fourth-generation base station or a fifth-generation base station.

7. The method of claim 1, wherein calculating the congestion delay for each of the bursts comprises:
performing a transmission control protocol congestion control analysis to calculate the congestion delay for each of the bursts.

8. A device, comprising:
one or more processors configured to:
set an initial burst length;
receive, from a packet probe, an uplink packet flow provided to a base station by a user equipment;

add bytes for packets of the uplink packet flow in each scheduling interval of multiple scheduling intervals;

group the packets into bursts based on the multiple scheduling intervals and based on adding the bytes for the packets;

calculate a transfer speed of each of the bursts;

calculate a maximum transfer speed for the bursts based on the transfer speed of each of the bursts;

calculate a congestion delay for each of the bursts based on the maximum transfer speed for the bursts and based on the initial burst length; and perform one or more actions based on the congestion delay for each of the bursts.

9. The device of claim 8, wherein the one or more processors, to calculate the congestion delay for each of the bursts, are configured to:

identify missing packets in the uplink packet flow to calculate the congestion delay for each of the bursts.

10. The device of claim 8, wherein the user equipment is a fixed wireless access user equipment or a mobile user equipment connected to the base station for a time period.

11. The device of claim 8, wherein the uplink packet flow is user plane traffic provided from the user equipment to a core network, via the base station.

12. The device of claim 8, wherein the one or more processors, to perform the one or more actions, are configured to:

generate a notification about the congestion delay; and provide the notification to a network operator.

13. The device of claim 8, wherein the one or more processors, to perform the one or more actions, are configured to:

dispatch a technician to service a network device associated with the congestion delay.

14. The device of claim 8, wherein the one or more processors, to perform the one or more actions, are configured to:

dispatch an autonomous vehicle to service a network device associated with the congestion delay.

15. A non-transitory computer-readable medium storing a set of instructions, the set of instructions comprising:

one or more instructions that, when executed by one or more processors of a device, cause the device to:

receive, from a packet probe, an uplink packet flow provided to a base station by a user equipment, wherein the base station is one of a fourth-generation base station or a fifth-generation base station;

add bytes for packets of the uplink packet flow in each scheduling interval of multiple scheduling intervals;

group the packets into bursts based on the multiple scheduling intervals and based on adding the bytes for the packets;

calculate a transfer speed of each of the bursts;

calculate a maximum transfer speed for the bursts based on the transfer speed of each of the bursts;

calculate a congestion delay for each of the bursts based on the maximum transfer speed for the bursts; and perform one or more actions based on the congestion delay for each of the bursts.

16. The non-transitory computer-readable medium of claim 15, wherein the one or more instructions further cause the device to:

update each of the bursts with a radio frequency signal strength of each of the bursts, wherein the one or more instructions, that cause the device to calculate the maximum transfer speed for the bursts based on the transfer speed of each of the bursts, cause the device to:

calculate the maximum transfer speed for the bursts based on the transfer speed of each of the bursts and based on updating each of the bursts with the radio frequency signal strength.

17. The non-transitory computer-readable medium of claim 16, wherein the one or more instructions further cause the device to:

receive the radio frequency signal strength of each of the bursts from an element management system.

18. The non-transitory computer-readable medium of claim 15, wherein the one or more instructions, that cause the device to calculate the congestion delay for each of the bursts, cause the device to:

perform a transmission control protocol congestion control analysis to calculate the congestion delay for each of the bursts.

19. The non-transitory computer-readable medium of claim 15, wherein the one or more instructions, that cause the device to calculate the congestion delay for each of the bursts, cause the device to:

identify missing packets in the uplink packet flow to calculate the congestion delay for each of the bursts.

20. The non-transitory computer-readable medium of claim 15, wherein the user equipment is a fixed wireless access user equipment or a mobile user equipment connected to the base station for a time period.

* * * * *